United States Patent [19]
Irish, Jr.

[11] 3,720,343
[45] March 13, 1973

[54] TAMPER PROOF BOTTLE CAP
[75] Inventor: Edwin M. Irish, Jr., St. Dorids, Pa.
[73] Assignee: Erin Industries, Inc., Villanova, Pa.
[22] Filed: Nov. 19, 1971
[21] Appl. No.: 200,397

[52] U.S. Cl. .................215/38 A, 215/42, 215/46 A, 215/7
[51] Int. Cl. .............................................B65d 55/02
[58] Field of Search ................215/38 A, 7, 42, 46 A

[56] References Cited

UNITED STATES PATENTS

| | | | |
|---|---|---|---|
| 3,189,208 | 6/1965 | Jowett | 215/38 A |
| 3,664,536 | 5/1972 | Emery | 215/42 |
| 3,314,564 | 4/1967 | Anderson et al. | 215/42 |

Primary Examiner—George T. Hall
Attorney—E. Barron Batchelder

[57] ABSTRACT

A milk bottle cap, apparatus and method, especially adapted as tamperproof closures for plastic milk bottles and the like. The bottle cap comprises a laminated disc structure containing a top layer of a rigid material, preferably an impervious plastic material, an intermediate layer which can be aluminum foil or the like, and a plastic foam disc for contact with the bottle opening. The disc, when placed on the bottle opening, is then sealed in place over the bottle opening and maintained in place by a heat shrink tube which is heat shrunk around and partially over the closure disc, and sealed thereto, and having a depending skirt in intimate sealing contact with the threads on the neck of the bottle. A tear strip is provided to initially break the seal to permit removal. The heat shrink material has sufficient strength and rigidity whereby the cap can be re-engaged, after removal, on the bottle threads for reclosure of the bottle.

9 Claims, 12 Drawing Figures

PATENTED MAR 13 1973 3,720,343
SHEET 1 OF 3
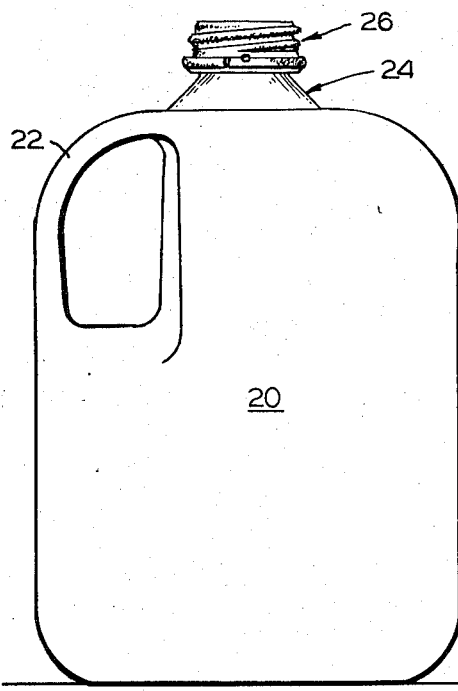
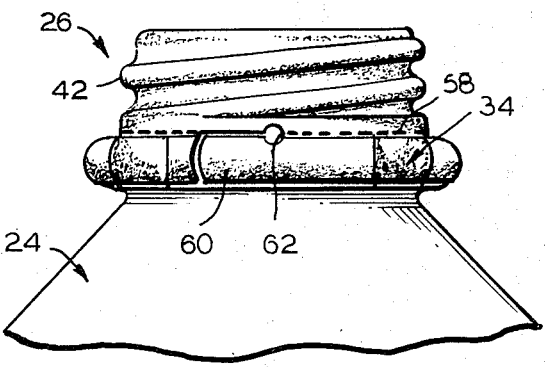
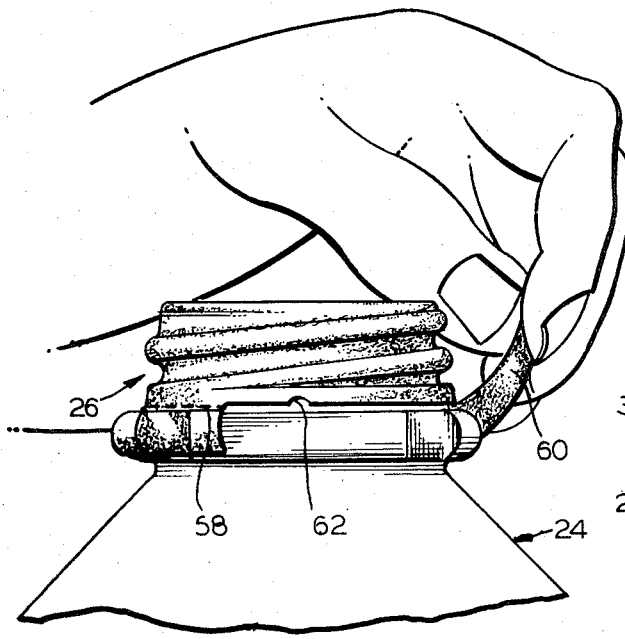
INVENTOR
EDWIN M. IRISH, JR.
E. Barron Batchelder
ATTORNEY

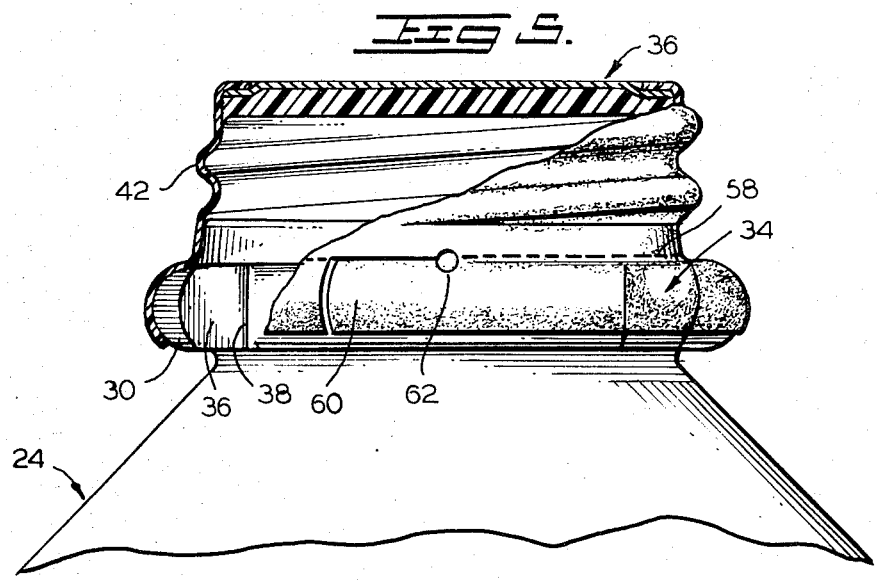
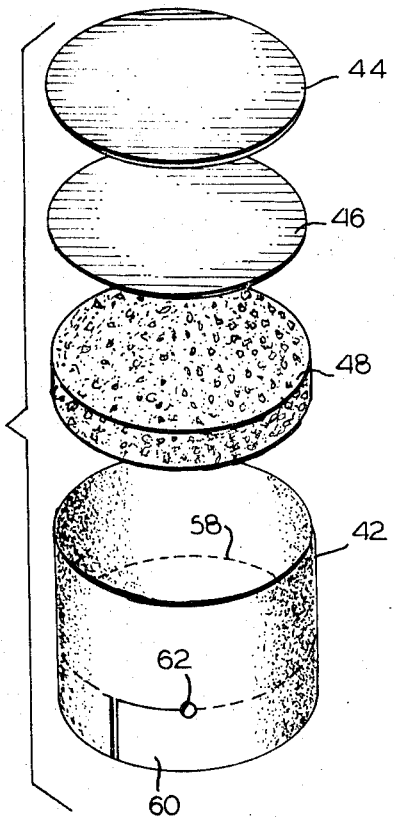
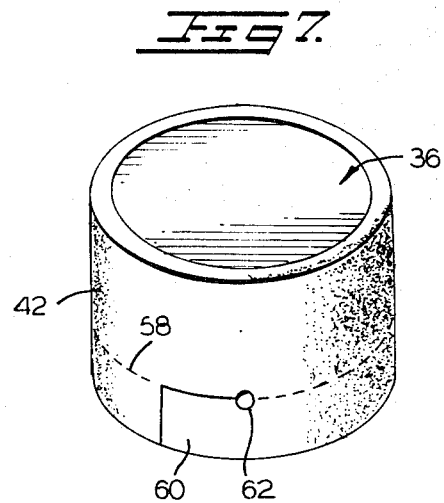

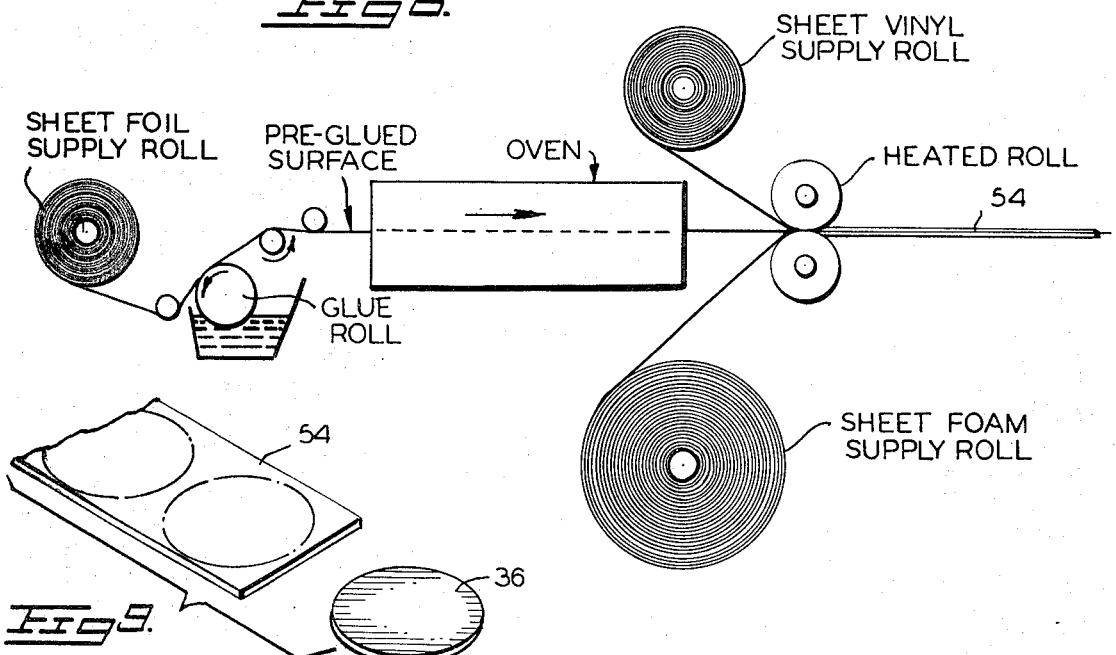
Fig. 8.
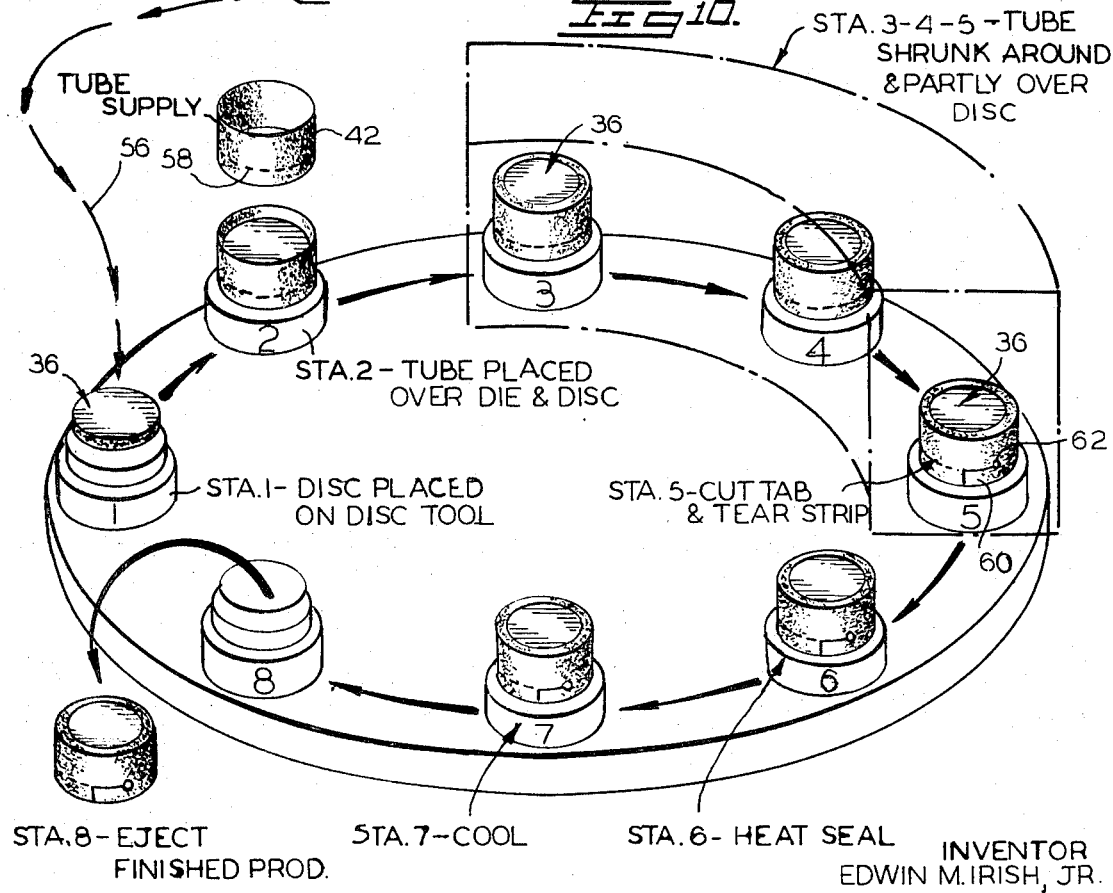
Fig. 9.
Fig. 10.

TAMPER PROOF BOTTLE CAP

BACKGROUND OF THE INVENTION

Heretofore, no good closure or cap has been available for plastic milk bottles. One of the principal difficulties encountered is the non-rigidity of the plastic bottles and in use a hydraulic ram principle tends to knock the cap off, such as with a disc inserted in the bottle opening. Caps, when applied to milk bottles, must also meet rigid Food and Drug Administration requirements. The cap must have zero gas and vapor penetration properties, and especially when utilized in a pharmaceutical application must have the property of preventing any such penetration. Materials in contact with the contents of the bottle must additionally meet rigid requirements to prevent contamination and the overall cap structure should be tamper-proof. Such caps must also be susceptible of feasible manufacturing and placement processes, and compatible with apparatus for so doing.

The present invention now provides for the first time a completely satisfactory bottle cap primarily adapted for use with plastic milk containers or the like, and which overcomes the undesirable characteristics of previous known structures.

BRIEF DESCRIPTION OF THE INVENTION

A laminated heat-shrink attachable bottle or container cap especially suited for threaded plastic milk bottles and the like, and a method for its manufacture and placement, wherein the layers in a preferred adhered composite form consist of an outer layer of rigid impervious plastic material, an intermediate layer which can be of aluminum foil, and a plastic foam disc for bottle opening, sealing and content contact. The cap in use, especially as applied to plastic milk bottles, is leak-proof, using a low pressure compressible and deformable seal material for the plastic foam disc. The plastic foam disc material must be acceptable by the Food and Drug Administration for use in milk bottles. The laminated disc is attached to and sealed on the container by means of a plastic heat shrinkable tube which insures a tight sealing engagement about the container opening, intimately engaging container neck threads, and the cap can be re-engaged to the threads. The construction is tamper-proof and is provided with a tear strip, serving the function of permitting removal and at the same time indicating removal of the cap from the container.

The material of the outer layer is liquid and gas impervious to prevent contamination of the container contents. The cap when applied to non-rigid containers will withstand a substantial drop of the container without exploding off. The composite structure and method of manufacture permits lamination of the materials of the plastic layers which are not susceptible of being an in-line continuous manufacture and placement of and sealing on a bottle.

Additional objects and advantages of the invention will be more readily understood from the following detailed description of an embodiment thereof, when taken together with the accompanying drawings, in which:

FIG. 1 is a side elevational view of the invention as applied to a plastic container for milk or the like;

FIG. 2 is an enlarged fragmentary elevational view of the closure means of FIG. 1;

FIG. 3 is a view similar to FIG. 2, showing a tear strip of the closure cap as partially removed prior to opening the container;

FIG. 4A is an exploded elevational view with the tear strip of FIG. 3 completely removed and the cap threadedly disconnected from the container and ready for secured reconnection;

FIG. 4B is a top elevational view of the container taken on line 4B — 4B of FIG. 4A disclosing means to prevent turning and loosening of the cap during storage and handling, or when removing the tear strip;

FIG. 5 is an enlarged fragmentary elevation view similar to FIG. 1, with parts broken away, showing the structural components employed to obtain the characteristics of the invention;

FIG. 6 is an exploded perspective view of the cap components shown in FIG. 5, and including an optional advertising disc or the like as a modification;

FIG. 6A is a fragmentary schematic view of the laminated cap disc components, with the interconnection thereof and therebetween;

FIG. 7 is a perspective view of the cap using an advertising disc of FIG. 6;

FIG. 8 is a schematic view depicting a preferred method of manufacture for laminating the disc portion of the closure cap;

FIG. 9 is a perspective view of the finalized product resulting from the process of FIG. 8 and formed into disc-shape, all as a continuation of the process of FIG. 8; and FIG. 10 is a schematic perspective view showing an indexing table and related apparatus employed in application of the closure cap and sealing on the container.

Referring now in more detail to the drawings, a plastic milk container 20 having a handle 22 and a threaded neck portion generally indicated at 24, has secured thereon the closure cap 26, generally designated, of the present invention. The container 20 is manufactured or consists of the usual non-rigid plastic material currently in use but, as will appear hereinafter, is preferably modified in the neck and thread structure in a preferred embodiment of the invention.

The threaded neck portion 24, referring to FIG. 4A, includes the usual threads 28 under which is a bead 30 of generally rounded configuration and providing, in connection with the underlying neck portion, a distinct undercut or indentation at 32 for purposes hereinafter to be described. The bead 30 is also preferably provided with a plurality of notches 34 evenly spaced about the periphery of the bead. It will be noted that the notches have faces 36, 38 formed at right angles one to another, and so designed as to permit manufacture of the bottle in a split blow mold which will provide for easy separation of the bottle from the mold. These notches are so configured not only to permit easy separation from the mold but also serve the purpose of preventing the cap from turning and loosening in storage and handling when the cap is applied, as will be described hereinafter, and additionally prevent the cap from turning and slipping when a tear strip is removed. As shown there are two notches on each side, four notches total in all.

The closure cap 26 consists of a laminated disc 36 and which is in contact with the container opening indicated at 38 in compression sealing engagement with the opening rim 40. The disc 36 is secured in closing position on and over the container by means of a tube of heat shrinkable plastic material 42 which in effect forms a skirt or depending flange interengaging disc 36 and threads 28 of the container. The components forming the disc are shown in FIGS. 6 and 6A. The laminated disc 36 is comprised of, in depending order, a rigid polyvinylchloride sheet 44, a coated aluminum foil sheet 46, and a sheet 48 of foam plastic. The only material which will contact the food or milk in the container is the foam sheet which meets with Food and Drug Administration approval. It also is compressible, deformable and resilient and in conjunction with the other features and components of the cap serves to aid in withstanding a four-foot drop for example. Two types of material which have been approved as meeting applicable FDA requirements are: (1) Minicel H-600-/16th inches thick extruded from sheet and manufactures by Hercules, Inc., Wilmington, Del., and (2) Microfoam extruded sheeting, 3/32nds inches thick, manufactured by DuPont Co., Wilmington, Del. (presently undergoing tests for FDA approval). It is also contemplated that polyethylene foam extruded or skived from a loaf having closed cell structure can be used, as also for example 10-15 pound PVC foam, resilient paper formulations, or other. Other possibilities, other than FDA polyethylene or PVC foams, are used of FDA approved film covering other foams, or FDA coating over other resilient constructions.

The disc 44 is preferably formed from polyvinylchloride sheet which is rigid and preferably 0.005 inches thick. One example of this type of material is type No. U.S. —2000 Food-Grade Genotherm sheet, clear or opaque white, which meets all applicable FDA requirements and manufactured by American Hoechst Corp., Somerville, N.J. This material lends strength and rigidity to the composite or laminated cap and also serves as a contaminant seal. The aluminum foil disc interposed between the discs 44 and 48 consists, preferably, of coated aluminum foil as supplied by Aluminum Co. of America, Pittsburgh, Pa. The coating 50, FIG. 6A, is an FDA approved vinyl heat-sealed coat, 2.5 lb./ream (0.0002 inches) Alcoa No. 200. The foil is Alcoa No. 1145-0 and is used in an applicable thickness range 0.0007 - 0.0015 inches. The surfaces of the metal foil are used in order to permit sealing of the vinyl to the foam material since the materials are incompatible. In other words, there must be a surface of something in between these other two discs to which they can each be adhered, since no practical and economical adhesive system has yet been devised to bond polyethylene direct to polyvinyl chloride. The aluminum foil layer in the cap also prevents all gas transmission in or out which could be otherwise deleterious to the product. It also facilitates the zero gas transmission for long shelf life products. As will appear hereinafter this aluminum foil, presuming a vinyl heat seal, as discussed hereinafter is useful for induction heating, and thermal sealing of straight vinyl. The aluminum foil serves as a heat sink for sealing, an inert surface for lamination, and an impervious barrier for oxygen. As shown in FIG. 6A an adhesive 52 is applied for aluminum to polyethylene adhesion. This preferably is a water-base pressure-sensitive adhesive such as polybond PA-651, manufactured by Polymer Industries, Inc. of Springdale, Conn., and which conforms to all applicable FDA requirements.

As alternative compositions with the aluminum foil, it is contemplated to eliminate the vinyl sheet and replace it with pulp board sheet between the foil and foam for stiffness and support of the foil. Additionally, the polyolefin foam can be eliminated and replaced with compressible low-density paperboard formulation with enough resilience to make a leak-proof seal. Manufacture of the laminated disc construction will be better understood by reference to FIG. 8 of the drawings. The sheet foil which is precoated or preglued on a surface thereof as described above is taken from a supply roll through or around a glue or adhesive supply as indicated by the glue roll for applying the adhesive 52 to the opposite side and then passed through a drying oven. The vinyl sheet 44 is fed from a sheet vinyl supply roll, as also is the sheet foam material 48 from a supply roll, and the two plastic layers or laminations are then applied to opposite sides of the foil and adhered thereto when passing through heated rolls as shown. This results in a strip of the laminated material indicated at 54 in FIG. 9. Also as shown the discs 34 are fed directly from the laminating and printing machine as they are punched out of the strip, as indicated by arrow 56, to a capping machine schematically shown in FIG. 10. Alternatively instead of the continuous process, it is contemplated that the discs 36 could be stacked and subsequently fed to the capping machine or apparatus.

In the above mentioned laminating process, in one embodiment the speed is approximately 15 feet per minute and the strip width is approximately 4 inches max. The precoated aluminum foil passes over the coating roll and metering roll in which 0.0005 inches max. of PAS PA-651 adhesive is deposited on the reverse side of the foil. The foil then passes through an electrically heated air circulating tunnel at 300° F., 6 feet max., and 20-25 seconds exposure, which dries the adhesive and activates the coating adhesive on the foil. The hot foil is then joined by 0.0005 inches vinyl sheet on top and polyethylene foam sheet on the bottom just prior to passing through the laminating rolls which with the proper pressure will form the permanent composite laminated sheet. The upper roll may be heated to for example 250° F. to facilitate the vinyl bond.

The discs so formed and fed to the capping machine of FIG. 10 are at station 1 placed on a disc tool and at station 2 a tube 42 of heat shrink material is placed over the die and disc. It is to be noted that the tube supply as indicated in FIG. 10 supplies the tubes with a perforation line at 58 as it is cut from a roll of the material. In stations 3-4-5 the tube is shrunk around and partly over the disc. This is accomplished by different heat methods as will be explained hereinafter. Preferably at station 5 a tab 60, strain relief hole 62, and perhaps printing of the tab are accomplished. In station 6 a heat seal function is performed. With aluminum, induction heating is contemplated, and/or thermal sealing-straight vinyl can be utilized. Station 7 is a cooling station and at station 8 the finished cap including the disc and the partially heat shrunk tube combination is ejected and appropriately stored for subsequent application to a bottle or container. The finalized cap product is shown more clearly in FIG. 7. An additional disc if desired can be placed over the disc 44 or alternatively the disc 44 can be printed with company advertising material or the like.

Subsequent to formation of the cap as described above, wherein the tube preferably is shrunk over the disc by application of 300° F. heat for 4 seconds and heat sealed for an appropriate time element using a standard induction heating unit or alternatively, without use of aluminum, a simple thermal, dielectric or impulse heat seal could be used, and the cooling constituting a surface cool with 65° air, the cap is ready for application to the container.

It will here be noted that the threads 28 of the container do not extend to infinity but terminate in a stop ring 64 above bead 30 and which is part of the bottle finish. The shape of this ring in relation to the large diameter ring and the perforation in the tube determines the shape of the cap after a tear strip has been removed. The cap when applied over the container bottle neck is then again heat shrunk and the material adheres to and conforms closely with the contour of the container neck including threads, ring, bead and notches. The cap skirt shrinks around and partially under the bead 30. The material extends into the notches, for the reasons above pointed out, and the perforation line 58 is arranged just slightly above the upper surface of the bead 30.

The present cap is tamper-proof in that it does shrink under the pronounced undercut formed at the bead so that removal of the cap without tearing off the tamper strip at the tab, as indicated in FIG. 3 of the drawings, would deform or destroy it to an extent that its replacement would be rendered impossible. Tearing of the tamper strip carries out several functions. It frees the cap for easy removal and replacement. Absence of the strip advertises the fact that the cap has been changed or removed and that the contents may have been contaminated. The notches facilitate prevention of turning. The shape of the stop ring 64 in relation to the bead and the perforation, determines the shape of the cap after the tear strip has been removed. The cap must have a certain flare at the bottom for easy removal and replacement. This is an important design characteristic of the invention. Also, as pointed out, the thickness of the tube material is such that sufficient rigidity and configuration is provided for easy replacement of the cap subsequent to removal from the bottle.

The features of the cap and its construction render it usable with an automatic capping machine, which is not shown herein since it does not constitute a portion of the present invention. It is significant that manufacturing processes and costs must be equated with useful end results and ease of application, as also functional results of the cap in normal usage.

Many outstanding features and characteristics results from the above described embodiment. It is leak-proof due to the compressible or deformable resilient seal and will withstand substantial drops of the container. Tamper-proof qualities are provided in that the tube is heat shrunk around the transfer ring or other undercuts and has custom designed flexibility. The cap is reclosable in that the tube material is heavy enough in wall thickness to retain screw threads or snap cap conformation. It is sanitary in that only FDA approved material is in contact with the food or contents such as milk. The construction is sterile, and the heat shrink process exposes a cap skirt material to 300° F. for 3-4 seconds. The cap is easy to open in the functional design of perforations for tear strip or breakaway ring as provided. Hermetic properties and zero gas transmission for long shelf life products are inherent. A low inventory can be maintained. Printing and marking is accomplished only on each cap as it is manufactured. The caps can be handled in stacks in low bulk or volume condition, fed directly as formed, and therefore low storage space is required and easy handling is insured. Standard dairy capping equipment can be used. No change in the dairy process is required with seal cap hooders. The cap is susceptible of colorful, decorative appearance with a wide latitude in colors, printing and decoration available.

While preferred embodiments have been shown and described obviously minor modifications in design and construction can be effected in the invention without departing from the spirit and scope thereof, as defined in, and limited solely by, the appended claims.

I claim:

1. A closure cap for threaded neck plastic containers and the like comprising:
   a. a laminated top disc adapted to engage over, and in sealing relationship with a container opening;
   b. a heat shrinkable plastic tube partially extending and engaging over and combined with said top disc, said tube:
      i. being partially heat shrunk into said engagement with said top disc; and
      ii. including a depending skirt adapted for sealing engagement over and with the threaded neck of a container by further heat shrinking subsequent to placement of the cap on a container.

2. A closure cap as claimed in claim 1, wherein said tube consists of thin-wall rigid polyvinylchloride heat-shrinkable tubing.

3. A closure cap as claimed in claim 2, wherein said laminated top disc comprises an upper disc of plastic material, an intermediate disc of aluminum foil and a lower disc of compressible material having sufficient resilience to make a leak-proof seal with the container opening.

4. A closure cap as claimed in claim 2, wherein said laminated disc includes a layer of aluminum foil, an upper layer of material of substantially rigid material and a lower layer of resilient material, said layers being adhesively secured to one another.

5. A closure cap as claimed in claim 3, wherein the top layer consists of rigid polyvinylchloride sheet material, said aluminum foil having a vinyl heat-seal thereon and the lower layer consisting of a foamed plastic material resilient in nature.

6. A closure cap as claimed in claim 5, wherein said upper layer and said foil are adhesively sealed by the application of heat to the vinyl heat-sealed coat, said foil and said foamed plastic being adhesively secured by a pressure sensitive adhesive.

7. A closure cap as claimed in claim 1 and including a tear strip and tab in said depending skirt, said tear strip constituting tamper-proof detection means and on removal permitting removal of the cap from a container and rethreading on the threaded neck plastic container.

8. A closure cap as claimed in claim 1, wherein said tube consists of thin-wall rigid heat shrinkable tubing of oriented polymeric material.

9. A closure cap as claimed in claim 16, wherein said material is selected from the group consisting of polyvinylchloride, nylon, polypropylene, and polystyrene.

* * * * *